(12) United States Patent
Chen

(10) Patent No.: US 12,483,465 B2
(45) Date of Patent: Nov. 25, 2025

(54) BIT INDEX EXPLICIT REPLICATION EGRESS PROTECTION

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 18/308,273

(22) Filed: Apr. 27, 2023

(65) Prior Publication Data

US 2023/0269129 A1    Aug. 24, 2023

Related U.S. Application Data

(63) Continuation of application No. PCT/US2021/054196, filed on Oct. 8, 2021.

(60) Provisional application No. 63/106,201, filed on Oct. 27, 2020.

(51) Int. Cl.
*H04L 41/0654* (2022.01)
*H04L 45/00* (2022.01)

(52) U.S. Cl.
CPC .......... *H04L 41/0654* (2013.01); *H04L 45/22* (2013.01)

(58) Field of Classification Search
CPC ...... H04L 41/0654; H04L 45/16; H04L 45/22
See application file for complete search history.

(56) References Cited

U.S. PATENT DOCUMENTS

2015/0138961 A1* 5/2015 Wijnands ............ H04L 12/1863
370/228

OTHER PUBLICATIONS

Atlas, Ed., et al., "Basic Specification for IP Fast Reroute: Loop-Free Alternates," RFC 5286, Sep. 2008, 31 pages.
Berger, et al., "The OSPF Opaque LSA Option," RFC 5250, Jul. 2008, 17 pages.
Bradner, "Key Words for Use in RFCs to Indicate Requirement Levels," RFC 2119, Mar. 1997, 3 pages.
Bryant, et al., "Remote Loop-Free Alternate (LFA) Fast Reroute (FRR)," RFC 7490, Apr. 2015, 29 pages.
Ginsberg, Ed., et al., "Bit Index Explicit Replication (BIER) Support via IS-IS," RFC 8401, Jun. 2018, 12 pages.
Ginsberg, et al., "IS-IS Flooding Scope Link State PDUs (LSPs)," RFC 7356, Sep. 2014, 23 pages.

(Continued)

*Primary Examiner* — Melvin C Marcelo
*Assistant Examiner* — Natali Pascual Peguero
(74) *Attorney, Agent, or Firm* — Conley Rose, P.C.

(57) ABSTRACT

A method implemented by a network node in a Bit Index Explicit Replication (BIER) domain is used to provide fast egress protection. The method includes receiving a type length value (TLV) structure that identifies a backup egress node for a destination network node and includes an entry that indicates whether a primary egress node and the backup egress node transmit a packet to a same customer edge (CE) or to different customer edges (CEs), generating an egress protection bit index forwarding table (EP-BIFT) including the backup egress node and the entry that indicates whether the primary egress node and the backup egress node transmit the packet to the same CE or to different CEs, and forwarding the packet in accordance with the EP-BIFT when the primary egress node has failed.

27 Claims, 8 Drawing Sheets

(56) References Cited

OTHER PUBLICATIONS

Hegde, et al., "Node Protection for SR-TE Paths," draft-hegde-spring-node-protection-for-sr-te-paths-03, Jul. 2, 2018, 13 pages.
Karan, et al., "Multicast-Only Fast Reroute," RFC 7431, Aug. 2015, 14 pages.
Katz, et al., "Bidirectional Forwarding Detection (Bfd)," RFC 5880, Jun. 2010, 49 pages.
Leiba, "Ambiguity of Uppercase vs Lowercase in RFC 2119 Key Words," RFC 8174, May 2017, 4 pages.
Lindem, Ed., et al., "Extensions to OSPF for Advertising Optional Router Capabilities," RFC 7770, 15 pages. Feb. 2016.
Litkowski, et al., "Topology Independent Fast Reroute Using Segment Routing," draft-ietf-rtgwg-segment-routing-ti-lfa-08, Jan. 21, 2022, 21 pages.
Narten, et al., "Guidelines for Writing an IANA Considerations Section in RFCs", RFC 5226, May 2008, 27 pages.
Psenak, Ed., et al., "OSPFv2 Extensions for Bit Index Explicit Replication (BIER)," RFC 8444, Nov. 2018, 12 pages.
Psenak, et al., "OSPFv2 Prefix/Link Attribute Advertisement," RFC 7684, Nov. 2015, 15 pages.
Rosen, Ed., et al., "Multicast VPN Using Bit Index Explicit Replication (BIER)," RFC 8556, Apr. 2018, 17 pages.
Shand, et al., "IP Fast Reroute Framework," RFC 5714, Jan. 2010, 15 pages.
Wijnands, Ed., et al, "Multicast Using Bit Index Explicit Replication (BIER)," RFC 8279, Nov. 2017, 43 pages.
Wijnands, Ed., et al., "Encapsulation for Bit Index Explicit Replication (BIER) in MPLS and Non-MPLS Networks," RFC 8296, Jan. 2018, 24 pages.
Zhang, et al., "Automatic Assignment of BIER BFR-ids in OSPF," draft-zhang-bier-bfrid-assignment-00, XP15110403A1, Dec. 21, 2015, 19 pages.

\* cited by examiner

| BFR-id (SI:BitString) | F-BM | BFR-NBR (Next Hop) | BEA | SC | BE-BFER | BF-BM | BBFR-NBR |
|---|---|---|---|---|---|---|---|
| 1 (0:00001) | 00001 | D | 0 | 1 | H (01000) | 01001 | H |
| 2 (0:00010) | 00110 | F | 0 | 0 | E (00100) | 00010 | E (TI-LFA) |
| 3 (0:00100) | 00110 | F | 0 | 0 | F (00010) | 00110 | F |
| 4 (0:01000) | 01000 | H | 0 | 1 | D (00001) | 01001 | D |
| 5 (0:10000) | 10000 | B | 0 | | 0 | NULL | NULL |

FIG. 2

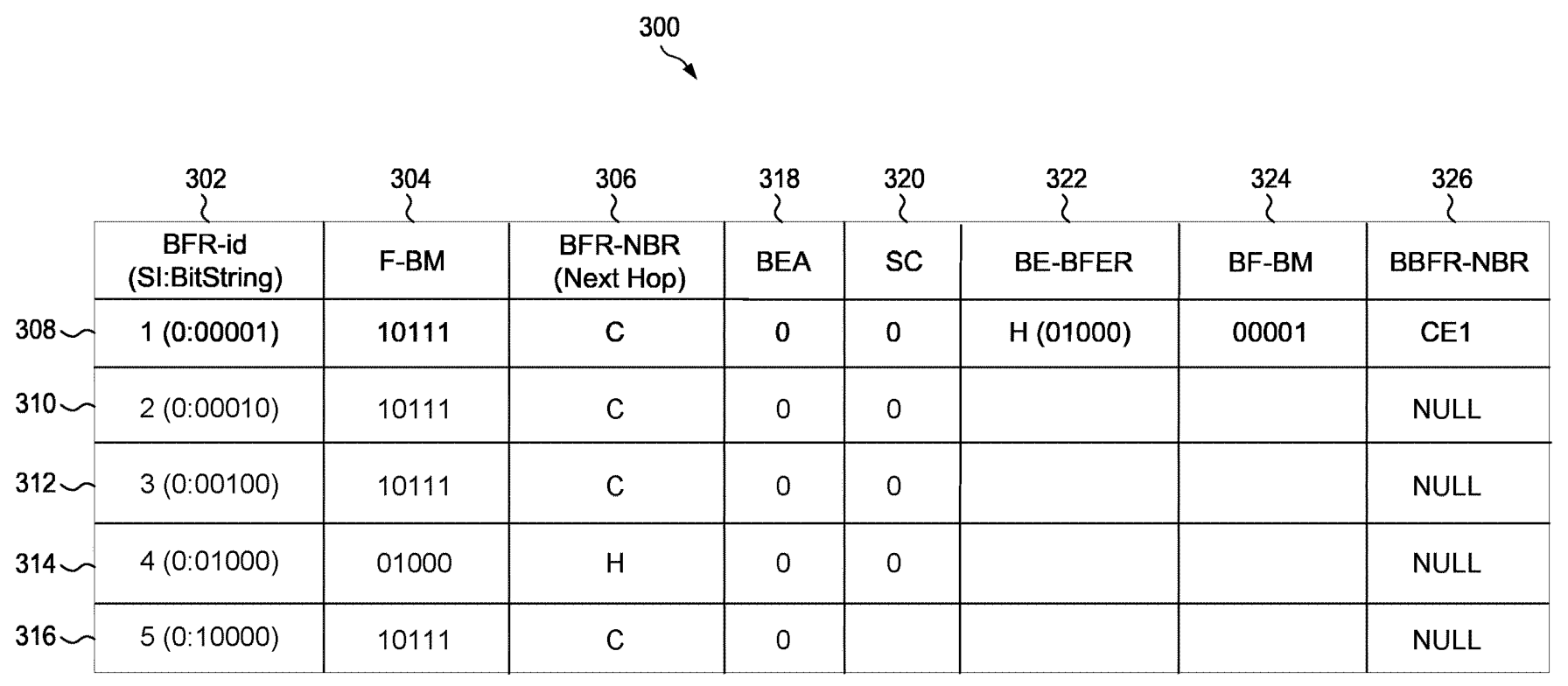

| BFR-id (SI:BitString) | F-BM | BFR-NBR (Next Hop) | BEA | SC | BE-BFER | BF-BM | BBFR-NBR |
|---|---|---|---|---|---|---|---|
| 1 (0:00001) | 10111 | C | 0 | 0 | H (01000) | 00001 | CE1 |
| 2 (0:00010) | 10111 | C | 0 | 0 | | | NULL |
| 3 (0:00100) | 10111 | C | 0 | 0 | | | NULL |
| 4 (0:01000) | 01000 | H | 0 | 0 | | | NULL |
| 5 (0:10000) | 10111 | C | 0 | 0 | | | NULL |

FIG. 3

Table 400

| BFR-id (SI:BitString) | F-BM | BFR-NBR (Next Hop) | SC | BE-BEFR |
|---|---|---|---|---|
| 1 (0:00001) | 01001 | H | 1 | H |
| 2 (0:00010) | 00110 | F | | |
| 3 (0:00100) | 00110 | F | | |
| 4 (0:01000) | 01001 | H | | |
| 5 (0:10000) | 10000 | B | | |

FIG. 4

Table 500

| BFR-id (SI:BitString) | F-BM | BFR-NBR (Next Hop) | SC | BE-BEFR |
|---|---|---|---|---|
| 1 (0:00001) | 00001 | CE1 | 0 | H |
| 2 (0:00010) | 10110 | C | | |
| 3 (0:00100) | 10110 | C | | |
| 4 (0:01000) | 01000 | CE2 | | |
| 5 (0:10000) | 10110 | C | | |

```
Packet = the packet received by BFR;
For each BFER k (from the rightmost in Packet's BitString) {
   If BFER k is the BFR itself   {
       copies Packet, sends the copy to the multicast
       flow overlay and clears k in Packet's BitString
   } else {
       finds the entry in EP-BIFT for the sub-domain using
       Packet's SI and BitString as the key/index
       If BEA == 1 { // Primary Egress fails
         If (BBFR-NBR is CE)  {// on Backup Egress
            Sends payload to CE;
         } ELSE {
           IF (SC==1) {// on PLR and SC ==1
              clears bit k in Packet's BitString;  //BFER k is PE-BFER
              adds bit j in Packet's BitString;   //BFER j is BE-BFER
           } // SC==0, no updates to packet
           Copies Packet, updates the copy's BitString by ANDing it
           with BF-BM in the entry, sends updated copy to BBFR-NBR;
         }
         updates Packet's Bitstring by ANDing it with ~BF-BM;
       } ELSE {
           Copies Packet, updates copy's Bitstring by ANDing
            it with F-BM in the entry, sends updated copy to BFR-NBR;
           updates Packet's BitString by ANDing it with ~F-BM
       }
   }
}
```

FIG. 8

BIT INDEX EXPLICIT REPLICATION EGRESS PROTECTION

CROSS-REFERENCE TO RELATED APPLICATIONS

This patent application is a continuation of International Application No. PCT/US2021/054196 filed on Oct. 8, 2021, by Futurewei Technologies, Inc., and titled "Bit Index Explicit Replication Egress Protection," which claims the benefit of U.S. Provisional Patent Application No. 63/106,201 filed Oct. 27, 2020 by Huaimo Chen and titled "Bit Index Explicit Replication Egress Protection," which is hereby incorporated by reference.

TECHNICAL FIELD

The present disclosure is generally related to the field of egress protection and, in particular, to egress protection against the failure of a node or link in a Bit Index Explicit Replication (BIER) domain.

BACKGROUND

BIER mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by I J. Wijnands, et al., published November 2017.

SUMMARY

The disclosed aspects/embodiments provide a fast egress protection (EP) for a BIER domain. To facilitate the fast egress protection procedure, a network node upstream of an egress node builds an egress protection bit index forwarding table (EP-BIFT). The EP-BIFT is used by the network node to forward packets when the egress node has failed. Therefore, packet routing within the BIER domain is improved.

A first aspect relates to a method implemented by a network node neighboring a primary egress node in a Bit Index Explicit Replication (BIER) domain, comprising: receiving a type length value (TLV) structure that identifies a backup egress node for a primary egress node and includes an entry that indicates whether the primary egress node and the backup egress node transmit a packet to a same customer edge (CE) receiver or to different CE receivers; generating an egress protection bit index forwarding table (EP-BIFT) including the backup egress node and the entry that indicates whether the primary egress node and the backup egress node transmit the packet to the same CE receiver or to different CE receivers; and forwarding the packet in accordance with the EP-BIFT when the primary egress node has failed.

Optionally, in any of the preceding aspects, another implementation of the aspect provides that the TLV structure is received from a primary egress node.

Optionally, in any of the preceding aspects, another implementation of the aspect provides that the TLV structure is received from a neighbor network node.

Optionally, in any of the preceding aspects, another implementation of the aspect provides that the EP-BIFT includes a backup entry active (BEA) field, and wherein an entry in the BEA field is set to indicate whether the primary egress node is working or has failed.

Optionally, in any of the preceding aspects, another implementation of the aspect provides that the entry that indicates whether the primary egress node and the backup egress node transmit the packet to the same CE receiver or to the different CE receivers is disposed in a same CE receiver (SC) field in the EP-BIFT.

Optionally, in any of the preceding aspects, another implementation of the aspect provides that the backup egress node is identified in a backup egress bit forwarding edge router (BE-BFER) field in the EP-BIFT.

Optionally, in any of the preceding aspects, another implementation of the aspect provides that generating the EP-BIFT includes generating a backup forwarding bitmask (BF-BM) for a destination network node in the EP-BIFT by applying a logical OR operation to the bitstring of the destination network node and the bitstrings of the other destination nodes whose BFR-NBRs are the same as the backup BFR-NBR (BBFR-NBR) for the destination network node.

Optionally, in any of the preceding aspects, another implementation of the aspect provides that the EP-BIFT includes a backup bit forwarding router neighbor (BBFR-NBR) field, and wherein an entry in the BBFR-NBR field indicates a next hop on a shortest path to the backup egress node without using the primary egress node.

Optionally, in any of the preceding aspects, another implementation of the aspect provides that a next hop identified in a backup bit forwarding router neighbor (BBFR-NBR) field for a primary egress node of the EP-BIFT is a basic loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is a remote loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is a topology independent loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is the backup egress node through a tunnel to the backup egress node without going through the primary egress node.

A second aspect relates to a network node neighboring a primary egress node in a Bit Index Explicit Replication (BIER) domain, comprising: a memory storing instructions; and one or more processors coupled to the memory, wherein the one or more processors are configured to execute the instructions to cause the network node to: receive a type length value (TLV) structure that identifies a backup egress node for a primary egress node and includes an entry that indicates whether the primary egress node and the backup egress node transmit a packet to a same customer edge (CE) receiver or to different CE receivers; generate an egress protection bit index forwarding table (EP-BIFT) including the backup egress node and the entry that indicates whether the primary egress node and the backup egress node transmit the packet to the same CE receiver or to different CE receivers; and forward the packet in accordance with the EP-BIFT when the primary egress node has failed.

Optionally, in any of the preceding aspects, another implementation of the aspect provides that the TLV structure is received from a primary egress node.

Optionally, in any of the preceding aspects, another implementation of the aspect provides that the TLV structure is received from a neighbor network node.

Optionally, in any of the preceding aspects, another implementation of the aspect provides that the EP-BIFT includes a backup entry active (BEA) field for a primary egress node, and wherein an entry in the BEA field is set to indicate whether the primary egress node is working or has failed.

Optionally, in any of the preceding aspects, another implementation of the aspect provides that the entry that indicates whether the primary egress node and the backup egress node transmit the packet to the same CE or to the different CEs is disposed in a same CE receiver (SC) field in the EP-BIFT.

Optionally, in any of the preceding aspects, another implementation of the aspect provides that the backup egress node is identified in a backup egress bit forwarding edge router (BE-BFER) field in the EP-BIFT.

Optionally, in any of the preceding aspects, another implementation of the aspect provides that generating the EP-BIFT includes generating a backup forwarding bitmask (BF-BM) for a destination network node in the EP-BIFT by applying a logical OR operation to the bitstring of the destination network node and the bitstrings of the other destination nodes whose BFR-NBRs are the same as the backup BFR-NBR (BBFR-NBR) for the destination network node.

Optionally, in any of the preceding aspects, another implementation of the aspect provides that the EP-BIFT includes a backup bit forwarding router neighbor (BBFR-NBR) field for a primary egress node, and wherein an entry in the BBFR-NBR field indicates a next hop on a shortest path to the backup egress node without using the primary egress node.

Optionally, in any of the preceding aspects, another implementation of the aspect provides that a next hop identified in a backup bit forwarding router neighbor (BBFR-NBR) field for a primary egress node of the EP-BIFT is a basic loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is a remote loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is a topology independent loop-free alternate (LFA) bit forwarding router (BFR) for the backup egress node.

Optionally, in any of the preceding aspects, another implementation of the aspect provides that a next hop identified in a backup bit forwarding router neighbor (BBFR-NBR) field for a primary egress node of the EP-BIFT is the backup egress node through a tunnel to the backup egress node without going through the primary egress node.

A third aspect relates to a method implemented by a network node in a Bit Index Explicit Replication (BIER) domain, comprising: generating a type length value (TLV) structure, wherein the TLV structure identifies a backup egress node for a primary egress node and includes an entry that indicates whether the primary egress node and the backup egress node transmit a packet to a same customer edge (CE) or to different customer edges (CEs); and transmitting the TLV structure to a neighbor network node of the primary egress node.

Optionally, in any of the preceding aspects, another implementation of the aspect provides that the TLV structure is an open shortest path first (OSPF) backup egress TLV.

Optionally, in any of the preceding aspects, another implementation of the aspect provides that the TLV structure is an intermediate system—intermediate system (IS-IS) backup egress TLV.

A fourth aspect relates to a network node neighboring a primary egress node in a Bit Index Explicit Replication (BIER) domain, comprising: receiving means configured to receive a type length value (TLV) structure that identifies a backup egress node for a primary egress node and includes an entry that indicates whether the primary egress node and the backup egress node transmit a packet to a same customer edge (CE) or to different customer edges (CEs); generating means configured to generate an egress protection bit index forwarding table (EP-BIFT) including the backup egress node and the entry that indicates whether the primary egress node and the backup egress node transmit the packet to the same CE or to different CEs; and forwarding means configured to forward the packet in accordance with the EP-BIFT when the primary egress node has failed.

A fifth aspect relates to a network node in a Bit Index Explicit Replication (BIER) domain, comprising: generating means configured to generate a type length value (TLV) structure, wherein the TLV structure identifies a backup egress node for a primary egress node and includes an entry that indicates whether the primary egress node and the backup egress node transmit a packet to a same customer edge (CE) or to different customer edges (CEs); and transmitting means configured to transmit the TLV structure to a neighbor network node of the primary egress node.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of an egress protection bit index forwarding table (EP-BIFT) of a network node according to an embodiment of the disclosure.

FIG. 3 is a schematic diagram of an EP-BIFT of a backup egress node according to an embodiment of the disclosure.

FIG. 4 is a schematic diagram of an EP-BIFT of a network node according to an embodiment of the disclosure.

FIG. 5 is a schematic diagram of an EP-BIFT of a backup egress node according to an embodiment of the disclosure.

FIG. 8 is an algorithm used to implement a portion of the forwarding procedure using the EP-BIFT according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently, there are no techniques for the fast protection against failure of an egress node in a BIER domain. Therefore, a customer edge (CE) receiver will not receive a requested packet when the egress node in the BIER domain fails.

Disclosed herein is a fast egress protection (EP) for a BIER domain. To facilitate the fast egress protection procedure, a network node upstream of an egress node builds an egress protection bit index forwarding table (EP-BIFT). The EP-BIFT is used by the network node to forward packets when the egress node has failed. Therefore, packet routing within the BIER domain is improved.

Figure 1:
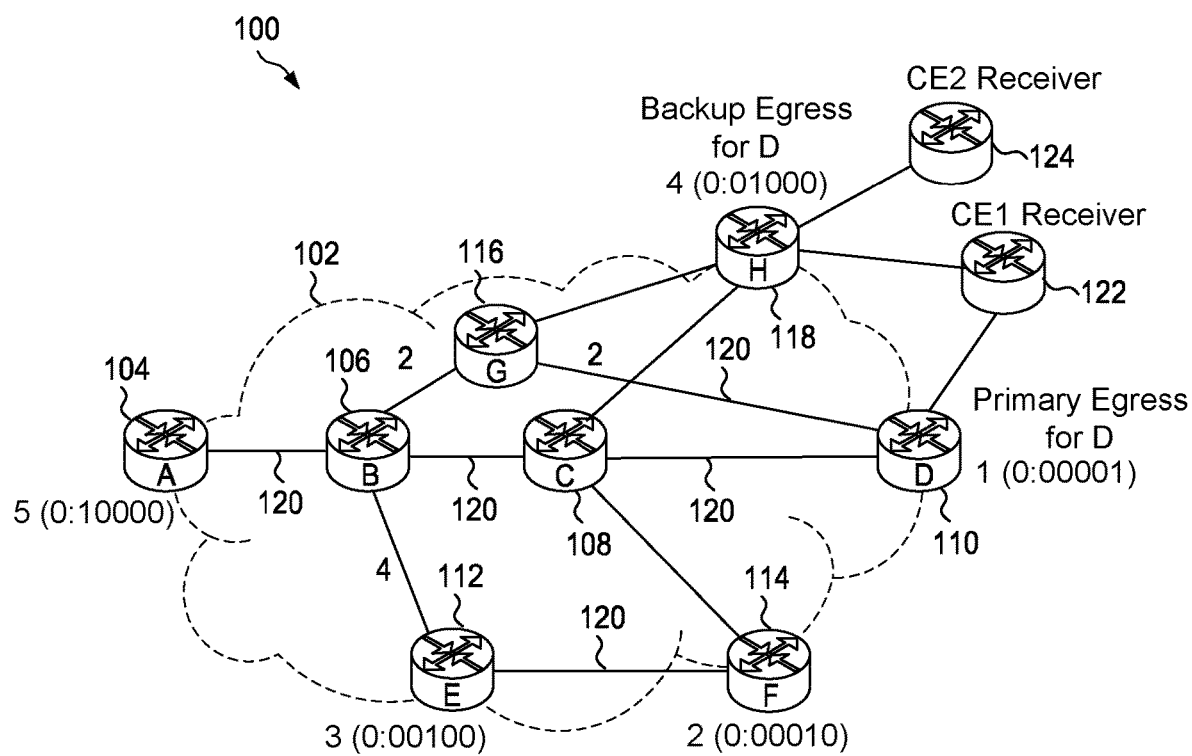
FIG. 1 is a schematic diagram of a BIER topology including a BIER domain.

FIG. 1 is a schematic diagram of a BIER topology 100 including a BIER domain 102. The BIER domain 102 may be part of a larger BIER domain (not shown). As such, the BIER domain 102 may be referred to herein as a BIER sub-domain. The BIER domain 102 comprises a plurality of network nodes 104, 106, 108, 110, 112, 114, 116, and 118. While eight network nodes 104-118 are shown in the BIER domain 102, more or fewer nodes may be included in practical applications.

For ease of discussion, all of the network nodes 104-118 have been given a letter designation. For example, the network node 104 has the designation A, the network node 106 has the designation B, the network node 108 has the designation C, the network node 110 has the designation D, the network node 112 has the designation E, the network node 114 has the designation F, the network node 116 has the designation G, and the network node 118 has the designation H.

Each of the network nodes 104-118 is a bit forwarding router (BFR). Some of the network nodes, namely the network nodes 104, 110, 112, 114 and 118, are disposed at an edge of the BIER domain 102. The network nodes 104, 110, 112, 114 and 118 receiving multicast packets from outside the BIER domain 102 may be referred to as a bit forwarding ingress router (BFIR). The network nodes 104, 110, 112, 114 and 118 transmitting multicast packets out of the BIER domain 102 may be referred to as a bit forwarding egress router (BFER). Depending on the direction of multicast packet traffic, each of the network nodes 104-118 may function as a BFIR or a BFER.

Each of the network nodes 104, 110, 112, 114 and 118 may be referred to herein as a destination network node. The network nodes 104, 110, 112, 114 and 118 have each been assigned a BFR identifier (BFR-id), a set index (SI), and a bitstring. For example, the network node 110 has a BFR-id of 1, has a SI of 0, and has a bitstring of 00001 (collectively illustrated as 1 (0:00001) in FIG. 1). The network node 114 has a BFR-id of 2, has a SI of 0, and has a bitstring of 00010 (collectively illustrated as 2 (0:00010)). The network node 112 has a BFR-id of 3, has a SI of 0, and has a bitstring of 00100 (collectively illustrated as 3 (0:00100)). The network node 118 has a BFR-id of 4, has a SI of 0, and has a bitstring of 01000 (collectively illustrated as 4 (0:01000)). The network node 104 has a BFR-id of 5, has a SI of 0, and has a bitstring of 10000 (collectively illustrated as 5 (0:10000)).

Each of the network nodes 104-118 has one or more neighbor nodes. As used herein, a neighbor node refers to a network node that is only one hop away from the network node. For example, network node 106 has four neighbor nodes in FIG. 1, namely network node 104, network node 108, network node 112, and network node 116. Indeed, each of network node 104, network node 108, network node 112, and network node 116 is only one hop away from network node 106.

The network nodes 104-118 in FIG. 1 are coupled to, and communicate with each other, via links 120. The links 120 may be wired, wireless, or some combination thereof. Each of the links 120 have a cost. For example, the cost of the link between network node 106 and network node 112 is 4 as shown in FIG. 1. Likewise, the cost of the link between network node 106 and network node 116 is 2 and the cost of the link between network node 116 and network node 110 is also 2. For any link 120 in FIG. 1 not showing a numerical value next to the link, the default cost is 1. For example, the cost of the link between network node 106 and network node 104 is 1.

The network node 110 may be referred to herein as a primary egress node (or simply an egress node), and the network node 118 may be referred to herein as a backup egress node for the primary egress node 110. In an embodiment, a primary egress node is a network node that functions as the primary point of egress for traffic received from a neighbor node while the network node is functioning normally. In an embodiment, a backup egress node is a network node that functions as the backup point of egress for traffic received from a neighbor node when the primary egress node is functioning abnormally or has failed. As shown, the network node 110 and the network node 118 are each coupled to a first customer edge (CE) receiver 122 outside the BIER domain 102. Thus, the first CE 122 is configured to receive packets from, and send packets to, the network node 110 and the network node 118. The network node 118 is coupled to a second CE receiver 124 outside the BIER domain 102. Thus, the second CE 124 is configured to receive packets from, and send packets to, the network node 118.

FIG. 2 is a schematic diagram of an egress protection bit index forwarding table (EP-BIFT) 200 of a network node. Each of the network nodes 104-118 in the BIER topology 100 in FIG. 1 generates an EP-BIFT 200. In an embodiment, the EP-BIFT is generated based on a bit routing table (BIRT) (not shown) that the network nodes 104-118 built.

The EP-BIFT 200 depicted in FIG. 2 is the EP-BIFT 200 built on the network node 108 in FIG. 1. As shown, the EP-BIFT 200 includes eight columns of information. The first column 202 includes the BFR-id of each destination network node in the BIER topology 100. A second column 204 includes a forwarding bit mask (F-BM). A third column 206 identifies the neighbor node (BFR-NBR) of the network node 108 used to reach the destination network node identified in the first column 202, which is why the neighbor node in the third column 206 may also be referred to as the next hop of the network node 108. The first column 202, the second column 204, and the third column 206 in the EP-BIFT 200 may be utilized by the network node 108 during normal operations (i.e., when the primary egress node 110 for the network node 108 is operating normally). That is, these columns are used when the entry in the backup entry active (BEA) field is set to zero.

Because the destination network nodes with the BFR-id of 2 and 3 in the second row 210 and the third row 212 in the EP-BIFT 200 each have an SI of 0 and each have the same BFR-NBR of network node F in the third column 206, the F-BM for those rows is a combination of the bitstrings of the destination nodes with the BFR-id of 2 and 3. In particular, a logical OR operation is applied to the bitstrings of the destination nodes with the BFR-id of 2 and 3. A logical OR of the bitstrings 00010 and 00100 results in an F-BM of 00110 in the second row 210 and the third row 212 in the EP-BIFT 200.

Because there are no other destination network nodes except for the destination network node D (a.k.a., network node 112) with the BFR-NBR of network node D in the third column 206, the F-BM in the first row 208 of the EP-BIFT 200 is the same as the bitstring of the destination network node D, which is 00001. Likewise, because there are no other destination network nodes except for the destination network node H (a.k.a., network node 118) with the BFR-NBR of network node H in the third column 206, the F-BM in the fourth row 214 of the EP-BIFT 200 is the same as the bitstring of the destination network node H, which is 01000. Finally, because there are no other destination network nodes except for the destination network node A (a.k.a., network node 104) with the BFR-NBR of network node B in the third column 206, the F-BM in the fifth row 216 of the EP-BIFT 200 is the same as the bitstring of the destination network node A, which is 10000.

The fourth column 218 includes a backup entry active (BEA) field. An entry in the BEA field is set to indicate whether the primary egress node is working or has failed. As an example, when an entry in the BEA field is set to a value of zero the primary egress node (e.g., network node 110) is properly functioning. However, when an entry in the BEA field is set to a value of one the primary egress node is not properly functioning (i.e., has failed).

The fifth column 220 includes a same receiver (SC) field. An entry in the SC field indicates whether the primary egress node (e.g., network node 110) and the backup egress node (e.g., network node 118) transmit a payload of a packet to the same CE receiver (e.g., CE receiver 122) or to different CE receivers (e.g., CE receiver 122 and CE receiver 124). As an example, when an entry in the SC field is set to one, the primary egress node and the backup egress node send the payload of a packet to the same CE receiver. When the entry in the SC field is set to zero, the primary egress node and the backup egress node send a packet to different CE receivers.

The sixth column 222 includes a backup egress BFER (BE-BFER) field. An entry in the BE-BFER field identifies the backup egress node for the primary egress node. As an example, the BE-BFER field in the first row 208 of the EP-BIFT 200 indicates that the network node H with Bit-string (01000) (e.g., the network node 118) is the backup egress node for the primary egress node D (e.g., network node 110). The BE-BFER field in the second row 210 of the EP-BIFT 200 indicates that the network node E with Bit-string (00100) (e.g., the network node 112) is the backup egress node for the primary egress node F (e.g., network node 114). The BE-BFER field in the third row 212 of the EP-BIFT 200 indicates that the network node F with Bit-string (00010) (e.g., the network node 114) is the backup egress node for the primary egress node E (e.g., network node 112). The BE-BFER field in the fourth row 214 of the EP-BIFT 200 indicates that the network node D with Bit-string (00001) (e.g., the network node 110) is the backup egress node for the primary egress node H (e.g., network node 118). Notably, the BE-BFER field in the fifth row 216 is set to zero because the network node C (e.g., network node 108) is unable to protect network node A (e.g., network node 104) because network node C does not have any information about the backup egress node for network node A as a primary egress node or is not a neighbor to network node A. That is, network node C is not immediately adjacent or directly connected to network node A.

The seventh column 224 includes a backup F-BM (BF-BM) field. The value in the BF-BM of a row is a combination of the bitstring of the destination network node in the row and the bitstrings of the destination nodes whose BFR-NBRs are the same as the backup BFR-NBR (BBFR-NBR) in the row. The first row 208 in the EP-BIFT 200 has destination network node with BFR-id of 1 and BBFR-NBR H. Because the destination network nodes with the BFR-id of 4 in the fourth row 214 in the EP-BIFT 200 has an SI of 0 and a BFR-NBR H that is the same as the BBFR-NBR H in the first row 208, the BF-BM for the first row 208 is a combination of the bitstrings of the destination nodes with the BFR-id of 1 and 4. In particular, a logical OR operation is applied to the bitstrings of the destination nodes with the BFR-id of 1 and 4. A logical OR of the bitstrings 00001 and 01000 results in a BF-BM of 01001 in the first row 208 and the fourth row 214 in the EP-BIFT 200.

The second row 210 in the EP-BIFT 200 has destination network node with BFR-id of 2 and BBFR-NBR of network node E. Because there are no other destination network nodes with the BFR-NBR that is the same as BBFR-NBR of network node E, the BF-BM in the second row 210 of the EP-BIFT 200 is the bitstring of destination node with the BFR-id of 2, which is 00010.

The third row 212 in the EP-BIFT 200 has destination network node with BFR-id of 3 and BBFR-NBR of network node F. Because the destination network node with the BFR-id of 2 in the second row 210 in the EP-BIFT 200 has an SI of 0 and a BFR-NBR that is the same as BBFR-NBR of network node F, the BF-BM for the third row is a combination of the bitstrings of the destination nodes with the BFR-id of 2 and 3. In particular, a logical OR operation is applied to the bitstrings of the destination nodes with the BFR-id of 2 and 3. A logical OR of the bitstrings 00010 and 00100 results in a BF-BM of 00110 in the third row 212 in the EP-BIFT 200.

The fourth row 214 in the EP-BIFT 200 has destination network node with BFR-id of 4 and BBFR-NBR of network node D. Because the destination network node with the BFR-id of 1 in the first row 208 in the EP-BIFT 200 has an SI of 0 and a BFR-NBR that is the same as BBFR-NBR of network node D, the BF-BM for the fourth row is a combination of the bitstrings of the destination nodes with the BFR-id of 1 and 4. In particular, a logical OR operation is applied to the bitstrings of the destination nodes with the BFR-id of 1 and 4. A logical OR of the bitstrings 00001 and 01000 results in a BF-BM of 01001 in the fourth row 214 in the EP-BIFT 200. For the destination network node A with the BFR-id of 5 in the fifth row 216 in the EP-BIFT 200, network node C is unable to provide egress protection for network node A (e.g., network node 104), the BF-BM in the fifth row 216 is null.

The eighth column 226 in the EP-BIFT 200 includes a backup BFR-NBR (BBFR-NBR) field. In an embodiment, the BBFR-NBR in a row is set to be a next hop on the shortest path to the BE-BFER (i.e., backup egress node) without going through the destination network node (i.e., primary egress node) in the row when the SC field in the row is one. In an embodiment, the BBFR-NBR in a row is set to be a basic Loop-Free Alternate (LFA) BFR for the backup egress node in the row when the SC field in the row is one. The basic LFA is described in detail in IETF document Request for Comments (RFC) 5286 entitled "Basic Specification for IP Fast Reroute: Loop-Free Alternates" by A. Atlas, et al., published September 2008. In an embodiment, the BBFR-NBR in a row is set to be a remote LFA-BFR for the backup egress node in the row when the SC field in the row is one. The remote LFA is described in detail in IETF document RFC 7490 entitled "Remote Loop-Free Alternate (LFA) Fast Reroute (FRR)" by S. Bryant, et al., published April 2015. In an embodiment, the BBFR-NBR in a row is set to be a topology independent loop-free alternate (TI-LFA) for the backup egress node in the row when the SC field in the row is one. The TI-LFA is described in detail in Internet Engineering Task Force (IETF) document entitled "Topology Independent Fast Reroute using Segment Routing" by S. Litkowski, et al., published June 2021. If the SC field is zero and the BBFR-NBR field set in the way for the SC field of one in a row is not the same as the BE-BFER field in the row and the BE-BFER is not on the shortest path from the BBFR-NBR to the primary egress node (i.e., the destination network node in the row) without going through the primary egress node in the middle, then the BBFR-NBR is set to the BE-BFER through a tunnel such as segment routing (SR) tunnel (or say TI-LFA tunnel) to the BE-BFER without going through the primary egress node. As an example, the SC field in the first row is one and an entry of H in the first row 208 of the BBFR-NBR field indicates that the node H (e.g., network node 118) is the next hop on the shortest path to backup egress node H without using the primary egress node D (e.g., network node 110).

The SC field in the second row 210 is zero. The entry of E (TI-LFA) in the second row 210 of the BBFR-NBR field indicates that network node E with TI-LFA tunnel from network node C to network node E is the TI-LFA for the backup egress node E without going through the primary egress node F (i.e., the destination network node F in the row). The network node B is not the next hop on the shortest path to network node E without using the primary egress node F (e.g., network node 114). Therefore, a topology independent loop-free alternate (TI-LFA) tunnel is used to transmit a packet intended for egress node F to network node E (i.e., the backup egress node) when network node F fails.

The SC field in the third row 212 is zero. The entry of F in the third row 212 of the BBFR-NBR field indicates that the node F (e.g., network node 114) is the next hop on the shortest path to the backup egress node F and the backup egress node F is on the shortest path from BBFR-NBR of F to the primary egress node E (i.e., the destination network node E in the row) without using the primary egress node E (e.g., network node 114) in the middle. The SC field in the fourth row is one. The entry of D in the fourth row 214 of the BBFR-NBR field indicates that the node D (e.g., network node 110) is the next hop on the shortest path to the backup egress node D without using the primary egress node H (e.g., network node 118).

Because node C is unable to provide egress protection for the destination network node with the BFR-id of 5 (i.e., network node A) in the fifth row 216 in the EP-BIFT 200, the BBFR-NBR field in the fifth row 216 is null.

The fourth column 218, the fifth column 220, the sixth column 222, the seventh column 224, and the eighth column 226 in the EP-BIFT 200 may be utilized by the network node 108 during abnormal operations (i.e., when the primary egress node 110 is not operating normally or has failed). That is, these columns are used when the entry in the BEA field is set to one.

FIG. 3 is a schematic diagram of an EP-BIFT 300 of a backup egress node according to an embodiment of the disclosure. The EP-BIFT 300 depicted in FIG. 3 is the EP-BIFT 300 built on the network node 118 in FIG. 1, which is the backup egress node for network node 110. As shown, the EP-BIFT 300 includes eight columns of information. The first column 302 includes the BFR-id of each destination network node in the BIER topology 100. A second column 304 includes a F-BM. A third column 306 identifies the BFR-NBR of the network node 118 used to reach the destination network node identified in the first column 302, which is why the neighbor node in the third column 306 may also be referred to as the next hop of the network node 118. The first column 302, the second column 304, and the third column 306 in the EP-BIFT 300 may be utilized by the network node 118 during normal operations. That is, these columns are used when the entry in the BEA field is set to zero.

Because the destination network nodes with the BFR-id of 1, 2, 3 and 5 in the first row 308, the second row 310, the third row 312, and the fifth row 316 in the EP-BIFT 300 each have an SI of 0 and each have the same BFR-NBR of network node C in the third column 306, the F-BM for those rows is a combination of the bitstrings of the destination nodes with the BFR-id of 1, 2, 3, and 5. In particular, a logical OR operation is applied to the bitstrings of the destination nodes with the BFR-id of 1, 2, 3, and 5. A logical OR of the bitstrings 00001, 00010, 00100, and 10000 results in an F-BM of 10111 in the first row 308, the second row 310, the third row 312, and the fifth row 316 in the EP-BIFT 300.

Because there are no other destination network nodes except for the destination network node H with the BFR-NBR of network node H in the third column 306, the F-BM in the fourth row 314 of the EP-BIFT 300 is the same as the bitstring of the destination network node H, which is 01000.

The BEA field, the SC field, the BE-BFER field, and the BF-BM field in the EP-BIFT 300 are similar to the BEA field, the SC field, the BE-BFER field, and the BF-BM field in EP-BIFT 200. Therefore, a full discussion of those fields is not repeated. The first row 308 in the EP-BIFT 300 has destination network node with BFR-id of 1 and BBFR-NBR CE1. Because there are no destination network nodes with the BFR-NBR of the CE1 receiver, the BF-BM in the first row 308 of the EP-BIFT 300 is the bitstring of destination node with the BFR-id of 1, which is 00001. Notably, several of the fields in the EP-BIFT 300 are blank because the network node H is a destination egress node in the BIER domain 100 and the backup egress node only for primary egress node D (i.e., the destination network node in the first row 308). The entries in the fields are unneeded.

When the entry in the BEA field of the EP-BIFT 300 is set to zero or the entry in the SC field of the EP-BIFT 300 is set to one, the network node H uses the first column 302, the second column 304, and the third column 306 to forward packets. Indeed, the first column 302, the second column 304, and the third column 306 are the same as a normal BIFT without egress protection that would be used by network node H.

When the entry in the BEA field in the first row 308 of the EP-BIFT 300 is set to one (meaning the primary egress node D has failed) and the entry in the SC field 320 in the row 308 of the EP-BIFT 300 is zero, the network node H uses the fourth column 318, the fifth column 320, the sixth column 322, the seventh column 324, and the eighth column 326 in the row 308 of the EP-BIFT 300 to forward packets with the network node D as the destination. When the entry in the SC field in the row 308 of the EP-BIFT 300 is set to zero (meaning the primary egress node D and the backup egress node H send packets to different CE receivers), the network node H will transmit the packet to CE1 receiver (CE receiver 122) when the network node H receives a packet with the network node D as the destination.

FIG. 4 is a schematic diagram of an EP-BIFT 400 of a network node according to an embodiment of the disclosure. The EP-BIFT 400 depicted in FIG. 4 is the EP-BIFT 400 built on the network node 108 in FIG. 1. The EP-BIFT 400 is similar to the EP-BIFT 200 of FIG. 2. As shown, the EP-BIFT 400 includes five columns of information. The first column 402 includes the BFR-id of each destination network node in the BIER topology 100. A second column 404 includes a F-BM. A third column 406 identifies the BFR-NBR of the network node 108 used to reach the destination network node identified in the first column 402.

The fourth column 420 includes a SC field. An entry in the SC field indicates whether the primary egress node (e.g., network node 110) and the backup egress node (e.g., network node 118) transmit a packet to the same CE receiver (e.g., CE receiver 122) or to different CE receivers (e.g., CE receiver 122 and CE receiver 124). As an example, when an entry is the SC field is set to one, the primary egress node and the backup egress node send a packet to the same CE receiver. When the entry is the SC field is set to zero, the primary egress node and the backup egress node send a packet to different CE receivers.

The fifth column 422 includes a BE-BFER field. An entry in the BE-BFER field identifies the backup egress node for the primary egress node. As an example, the BE-BFER field in the first row 408 of the EP-BIFT 400 indicates that the network node H (e.g., the network node 118) is the backup egress node for the primary egress node D (e.g., network node 110). The EP-BIFT 400 of FIG. 4 only contemplates the failure of the primary egress node D (i.e., the destination network node D in the first row 408). Therefore, some entries in the second row 410, the third row 412, the fourth row 414, and the fifth row 416 have been left blank. The entry in the BFR-NBR field (i.e., the third column 406) in the first row 408 is set to the corresponding BBFR-NBR H in EP-BIFT 200 in FIG. 2. For each primary egress node (i.e., network destination node) that is a neighbor of a network node (e.g., the network node 108), the network node builds an EP-BIFT that contemplates the failure of the primary egress node. When the network node detects the failure of a primary egress node, the network node uses the EP-BIFT that contemplates the failure of the primary egress node to forward packets.

When the network node 108 detects the failure of the primary egress node D (e.g., the destination node with bitstring 00001), the network node 108 uses the EP-BIFT 400 to forward packets. In that regard, the network node 108 transmits a packet to network node H after clearing the bit in the bitstring for primary egress node D and adding the bit for the backup egress node H since the entry in the SC field is one. Had the entry in the SC field been set to zero, the network node 108 would have transmitted the packet to network node H without clearing the bit for the primary egress node D or adding the bit for backup egress node H. After receiving the packet intended for the primary egress node D, the backup egress node H transmit the payload of the packet to the CE1 receiver.

FIG. 5 is a schematic diagram of an EP-BIFT 500 of a backup egress node according to an embodiment of the disclosure.

The EP-BIFT 500 depicted in FIG. 5 is the EP-BIFT 500 built on the network node 118 in FIG. 1. The EP-BIFT 500 is similar to the EP-BIFT 300 of FIG. 3. As shown, the EP-BIFT 500 includes five columns of information. The first column 502 includes the BFR-id of each destination network node in the BIER topology 100. A second column 504 includes a F-BM. A third column 506 identifies the BFR-NBR of the network node 108 used to reach the destination network node identified in the first column 502.

The fourth column 520 includes a SC field. An entry in the SC field indicates whether the primary egress node (e.g., network node 110) and the backup egress node (e.g., network node 118) transmit a packet to the same CE receiver (e.g., CE receiver 122) or to different CE receivers (e.g., CE receiver 122 and CE receiver 124). As an example, when an entry in the SC field is set to one, the primary egress node and the backup egress node send a packet to the same CE receiver. When the entry in the SC field is set to zero, the primary egress node and the backup egress node send a packet to different CE receivers.

The fifth column 522 includes a BE-BFER field. An entry in the BE-BFER field identifies the backup egress node for the primary egress node. As an example, the BE-BFER field in the first row 508 of the EP-BIFT 500 indicates that the network node H (e.g., the network node 118) is the backup egress node for the primary egress node D (e.g., network node 110). The EP-BIFT 500 of FIG. 5 only contemplates the failure of the primary egress node D. Therefore, some entries in the second row 510, the third row 512, the fourth row 514, and the fifth row 516 have been left blank. The entry in the BFR-NBR field (i.e., the third column 506) in the first row 508 is set to the corresponding BBFR-NBR CE1 in EP-BIFT 300 of FIG. 3. For each primary egress node (i.e., network destination node) of a backup egress node (e.g., the network node 118), the network node (i.e., backup egress node) builds an EP-BIFT that contemplates the failure of the primary egress node. When the network node detects the failure of a primary egress node, the network node uses the EP-BIFT that contemplates the failure of the primary egress node to forward packets.

When the network node 118 detects the failure of the primary egress node D (e.g., the destination node with bitstring 00001), the network node 118 uses the EP-BIFT 500 to forward packets. In that regard, the network node 118 transmits a payload of a packet with the network node D as the destination to CE1 receiver.

Notably, one or more of the network nodes described herein may detect the failure of a neighbor network node using, for example, bidirectional forwarding detection (BFD). A network node that is not directly coupled to, or immediately adjacent to, another node may detect a failure in the other network node using, for example, multi-hop BFD.

Figure 6:
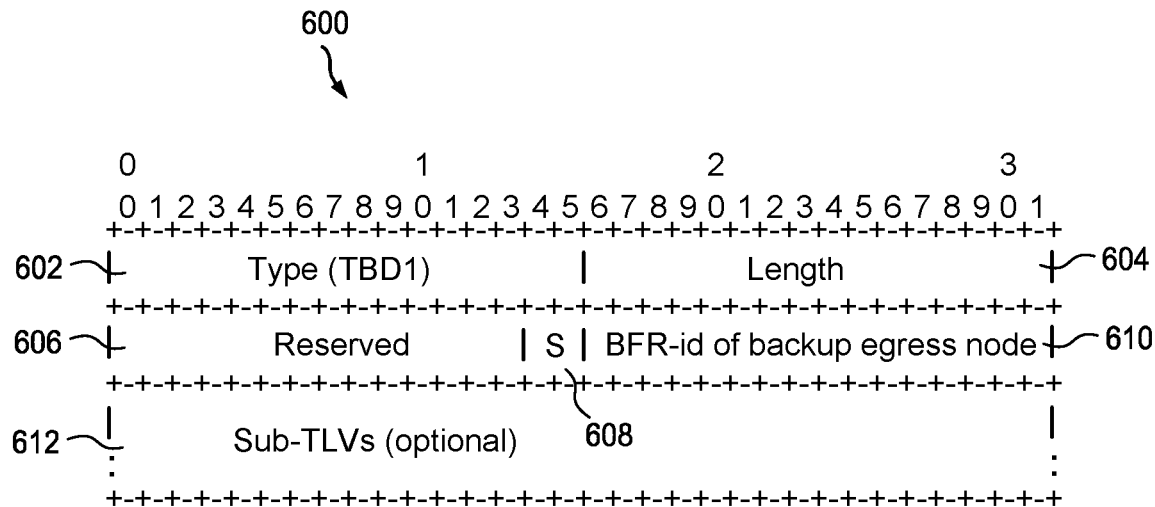
FIG. 6 is an open shortest path first (OSPF) type length value (TLV) structure according to an embodiment of the disclosure.

FIG. 6 is an OSPF TLV structure 600 according to an embodiment of the disclosure. In an embodiment, the OSPF TLV structure 600 is originated and transmitted by primary egress node (e.g., network node 110) to another network node (e.g., network node 108). The OSPF TLV structure 600 may be used to build an EP-BIFT as discussed herein.

As shown, the OSPF TLV structure 600 includes a type field 602, a length field 604, a reserved field 606, an S field 608, a BFR-id of backup egress node field 610, and an optional sub-TLVs field 612. The type field 602 is two octets and is configured to include a value (a.k.a., entry) yet to be assigned by the Internet Assigned Numbers Authority (IANA). The length field 604 is two octets and is configured to include a value indicating the length of the TLV structure excluding the type field and length field. In an embodiment, the value is four when no sub-TLVs are included in the sub-TLVs field 612, and four plus the length of the sub-TLVs when sub-TLVs are included in the sub-TLVs field 612.

The reserved field 606 is fifteen bits. In an embodiment, the reserve field 606 is populated with all zeros when the OSPF TLV structure 600 is transmitted and will be ignored when the OSPF TLV structure 600 is received.

The S field 608 is one bit (a.k.a., a one bit flag). The flag is set to one to indicate that the primary egress node and the backup egress node transmit a payload of a packet to the same CE receiver (e.g., CE receiver 122). The flag is set to zero to indicate that the primary egress node and the backup egress node transmit the payload of the packet to different CE receivers (e.g., CE receiver 122 and CE receiver 124).

The BFR-id of backup egress node field 610 is two octets. The value in the BFR-id of backup egress node field 610 is the BFR-id of the backup egress node configured to protect against the failure of the primary egress node (i.e., the node originating the OSPF TLV structure 600).

Figure 7:
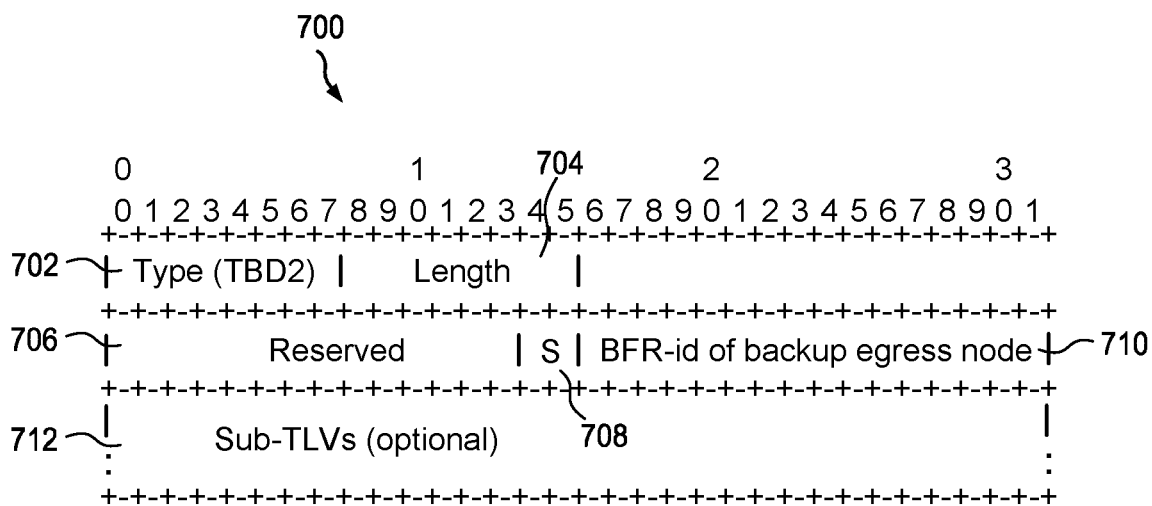
FIG. 7 is an intermedia system-intermediate system (IS-IS) type length value (TLV) structure according to an embodiment of the disclosure.

FIG. 7 is an IS-IS TLV structure 700 according to an embodiment of the disclosure. In an embodiment, the IS-IS TLV structure 700 is originated and transmitted by primary egress node (e.g., network node 110) to another network node (e.g., network node 108). The IS-IS TLV structure 700 may be used to build an EP-BIFT as discussed herein.

As shown, the IS-IS TLV structure 700 includes a type field 702, a length field 704, a reserved field 706, an S field 708, a BFR-id of backup egress node field 710, and an optional sub-TLVs field 712. The type field 702 is one octet and is configured to include a value yet to be assigned by the IANA. The length field 704 is one octet and is configured to include a value indicating the length of the TLV structure excluding the type field and length field. In an embodiment, the value is four when no sub-TLVs are included in the sub-TLVs field 712, and four plus the length of the sub-TLVs when sub-TLVs are included in the sub-TLVs field 712.

The reserved field 706 is fifteen bits. In an embodiment, the reserve field 706 is populated with all zeros when the IS-IS TLV structure 700 is transmitted and will be ignored when the IS-IS TLV structure 700 is received.

The S field 708 is one bit (a.k.a., a one bit flag). The flag is set to one to indicate that the primary egress node and the backup egress node transmit a payload of a packet to the same CE receiver (e.g., CE receiver 122). The flag is set to zero to indicate that the primary egress node and the backup egress node transmit the payload of the packet to different CE receivers (e.g., CE receiver 122 and CE receiver 124).

The BFR-id of backup egress node field 710 is two octets. The value in the BFR-id of backup egress node field 710 is the BFR-id of the backup egress node configured to protect against the failure of the primary egress node (i.e., the node originating the IS-IS TLV structure 700).

FIG. 8 is an algorithm 800 used to implement a portion of the forwarding procedure using the EP-BIFT according to an embodiment of the disclosure. In particular, the algorithm 800 may be used to clear a bit or add a bit in the bitstring of a packet as described above.

Upon receipt of a packet, for each BFER k (from the right in the bitstring of the packet), the network node (a.k.a., BFR) copies the packet and sends the copy to the multicast flow overlay and clears bit k in the bitstring of the packet when the BFER k is the BFR. When the BFER k is not the BFR, the network node finds the entry in the EP-BIFT for the BIER domain (a.k.a., sub-domain) using the set index and the bitstring as the key/index.

When the primary egress node has failed (e.g., BEA in the entry for the primary egress node as the network destination node has a value of one), the network node (e.g., as the backup egress node) sends the payload of the packet to a CE receiver when the BBFR-NBR in the entry is the CE receiver. When the SC has a value of one, the network node (e.g., as the point of local repair (PLR)) clears bit k in the bitstring of the packet wherein bit k is the bit for the primary egress BFER (PE-BEFR) node and adds a bit j in the bitstring of the packet wherein bit j is the bit for the backup egress BFER (BE-BEFR) node. When SC has a value of zero, the network node does not update the bitstring of the packet. Thereafter, the network node makes a copy of the packet (or updated packet), updates the bitstring of the copy by applying a logical AND operation to the bitstring of the copy and the BF-BM, and sends the updated copy to the BBFR-NBR. The network node updates the bitstring of the packet by applying a logical AND operation to the bitstring of the packet and the inverse of the BF-BM (a.k.a., ~BF-BM).

When the primary egress node has not failed (e.g., BEA has a value of zero), the network node copies the packet and updates the bitstring of the copied packet by applying a logical AND operation to the bitstring of the copied packet and the F-BM. Thereafter, the network node sends the updated copy of the packet to the BFR-NBR and updates the bitstring of the packet by applying a logical AND operation to the bitstring of the packet and the inverse of the F-BM (a.k.a., ~F-BM).

Figure 9:
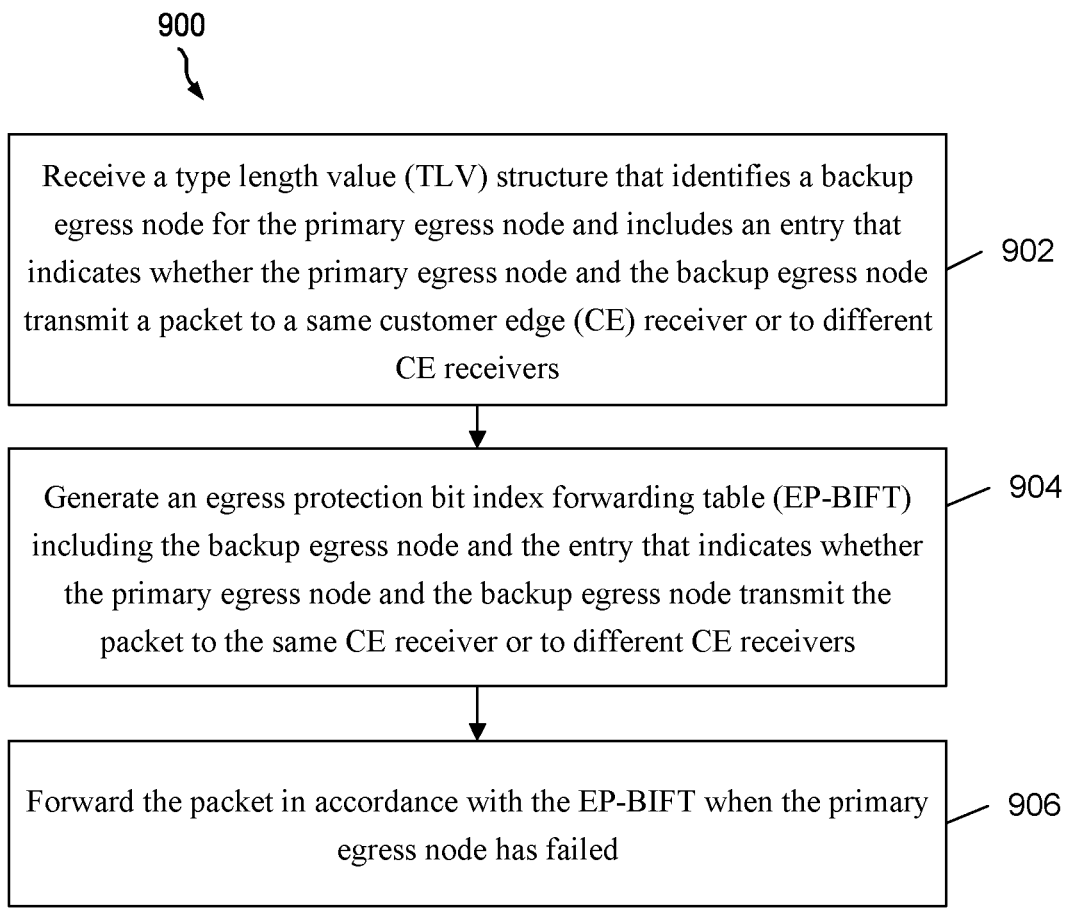
FIG. 9 is a method implemented by a network node in the BIER domain according to an embodiment of the disclosure.

FIG. 9 is a method 900 implemented by a network node (e.g., network node 108) in the BIER domain according to an embodiment of the disclosure. The method may be performed by the network node.

In block 902, the network node receives a TLV structure that identifies a backup egress node for a primary egress node and includes an entry that indicates whether the primary egress node and the backup egress node transmit a packet to a same CE receiver or to different CE receivers. In an embodiment, the TLV structure is received from a primary egress node. In an embodiment, the TLV structure is received from a neighbor network node.

In block 904, the network node generates an EP-BIFT including the backup egress node and the entry that indicates whether the primary egress node and the backup egress node transmit the packet to the same CE receiver or to different CE receivers. In an embodiment, the EP-BIFT includes a BEA field, and an entry in the BEA field is set to indicate whether the primary egress node is working or has failed. In an embodiment, the entry that indicates whether the primary egress node and the backup egress node transmit the packet to the same CE receiver or to the different CE receivers is disposed in an SC field in the EP-BIFT. In an embodiment, the backup egress node is identified in a BE-BFER field in the EP-BIFT.

In an embodiment, generating the EP-BIFT includes generating a BF-BM for a destination network node with a BBFR-NBR in the EP-BIFT by applying a logical OR operation to a bitstring of the destination network node and the bitstrings of the other destination nodes whose BFR-NBRs are the same as the BBFR-NBR. In an embodiment, the EP-BIFT includes a BBFR-NBR field, and an entry in the BBFR-NBR field indicates a next hop on a shortest path to the backup egress node without using the primary egress node.

In an embodiment, a next hop identified in a BBFR-NBR field of the EP-BIFT is a basic LFA BFR for the backup egress node. In an embodiment, a next hop identified in a BBFR-NBR field of the EP-BIFT is a remote LFA BFR for the backup egress node. In an embodiment, a next hop identified in a BBFR-NBR field of the EP-BIFT is a topology independent LFA BFR for the backup egress node.

In block 906, the network node forwards the packet in accordance with the EP-BIFT when the primary egress node has failed.

Figure 10:
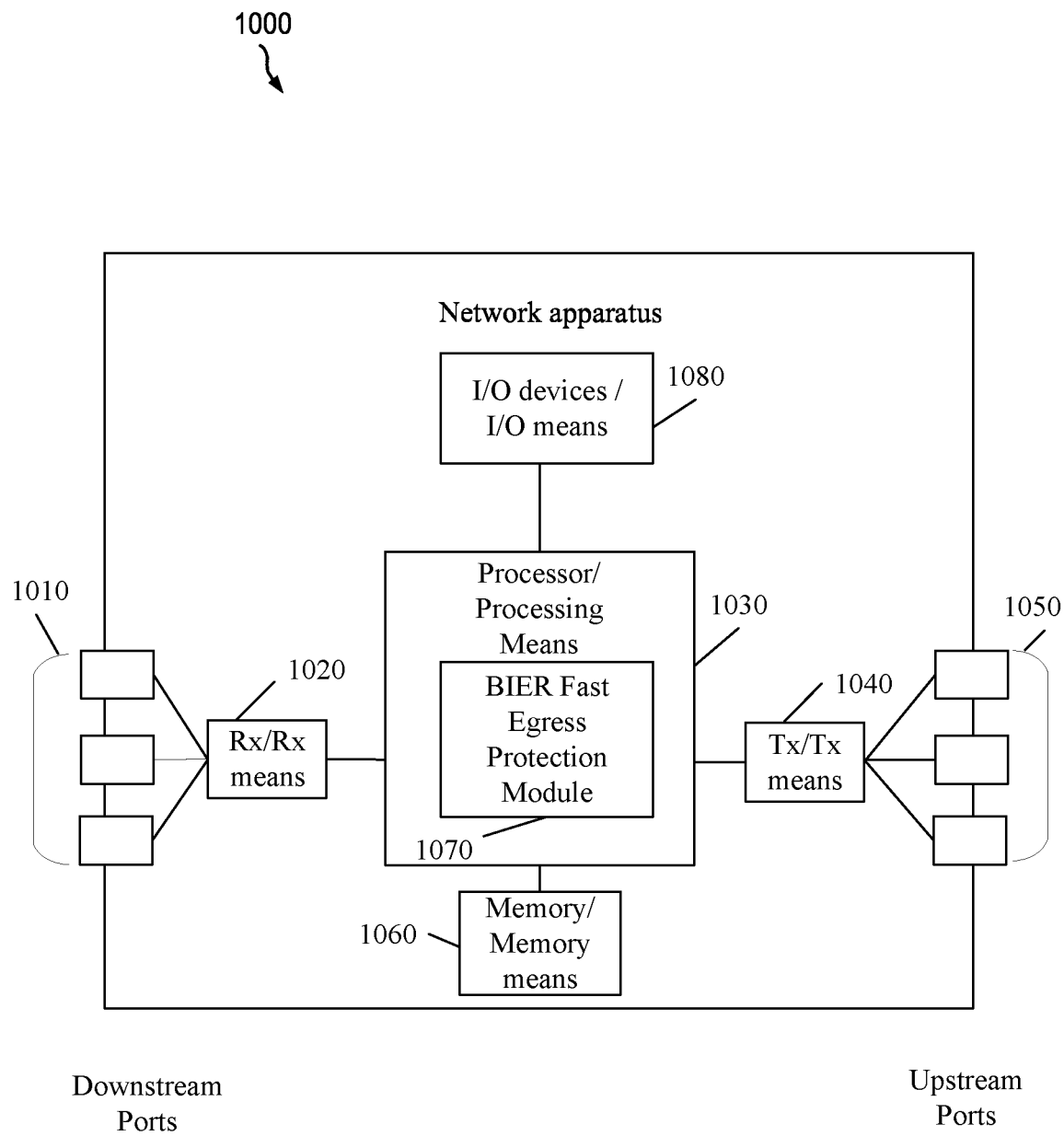
FIG. 10 is a schematic diagram of a network apparatus according to an embodiment of the disclosure.

FIG. 10 is a schematic diagram of a network apparatus 1000 (e.g., a network node, a destination node, a neighbor node, etc.). The network apparatus 1000 is suitable for implementing the disclosed embodiments as described herein. The network apparatus 1000 comprises ingress ports/ingress means 1010 and receiver units (Rx)/receiving means 1020 for receiving data; a processor, logic unit, or central processing unit (CPU)/processing means 1030 to process the data; transmitter units (Tx)/transmitting means 1040 and egress ports/egress means 1050 for transmitting the data; and a memory/memory means 1060 for storing the data. The network apparatus 1000 may also comprise optical-to-electrical (OE) components and electrical-to-optical (EO) components coupled to the ingress ports/ingress means 1010, the receiver units/receiving means 1020, the transmitter units/transmitting means 1040, and the egress ports/egress means 1050 for egress or ingress of optical or electrical signals.

The processor/processing means 1030 is implemented by hardware and software. The processor/processing means 1030 may be implemented as one or more CPU chips, cores (e.g., as a multi-core processor), field-programmable gate arrays (FPGAs), application specific integrated circuits (ASICs), and digital signal processors (DSPs). The processor/processing means 1030 is in communication with the ingress ports/ingress means 1010, receiver units/receiving means 1020, transmitter units/transmitting means 1040, egress ports/egress means 1050, and memory/memory means 1060. The processor/processing means 1030 comprises a BIER fast egress protection module 1070. The BIER fast egress protection module 1070 is able to implement the methods disclosed herein. The inclusion of the BIER fast egress protection module 1070 therefore provides a substantial improvement to the functionality of the network apparatus 1000 and effects a transformation of the network apparatus 1000 to a different state. Alternatively, the BIER fast egress protection module 1070 is implemented as instructions stored in the memory/memory means 1060 and executed by the processor/processing means 1030.

The network apparatus 1000 may also include input and/or output (I/O) or devices/I/O means 1080 for communicating data to and from a user. The I/O devices or I/O means 1080 may include output devices such as a display for displaying video data, speakers for outputting audio data, etc. The I/O devices or I/O means 1080 may also include input devices, such as a keyboard, mouse, trackball, etc., and/or corresponding interfaces for interacting with such output devices.

The memory/memory means 1060 comprises one or more disks, tape drives, and solid-state drives and may be used as an over-flow data storage device, to store programs when such programs are selected for execution, and to store instructions and data that are read during program execution. The memory/memory means 1060 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network node neighboring a primary egress node in a Bit Index Explicit Replication (BIER) domain, comprising:
    receiving a type length value (TLV) structure that identifies a backup egress node for the primary egress node and includes an entry that indicates whether the primary egress node and the backup egress node transmit a packet to a same customer edge (CE) receiver or to different CE receivers;
    generating an egress protection bit index forwarding table (EP-BIFT) including the backup egress node and the entry that indicates whether the primary egress node and the backup egress node transmit the packet to the same CE receiver or to different CE receivers; and
    forwarding the packet in accordance with the EP-BIFT when the primary egress node has failed.

2. The method of claim 1, wherein the TLV structure is received from the primary egress node.

3. The method of claim 1, wherein the TLV structure is received from a neighbor network node.

4. The method of claim 1, wherein the EP-BIFT includes a backup entry active (BEA) field, and wherein an entry in the BEA field is set to indicate whether the primary egress node is working or has failed.

5. The method of claim 1, wherein the entry that indicates whether the primary egress node and the backup egress node transmit the packet to the same CE receiver or to the different CE receivers is disposed in a same CE receiver (SC) field in the EP-BIFT.

6. The method of claim 1, wherein the backup egress node is identified in a backup egress bit forwarding edge router (BE-BFER) field in the EP-BIFT.

7. The method of claim 1, wherein generating the EP-BIFT includes generating a backup forwarding bitmask (BF-BM) for a destination network node in the EP-BIFT by applying a logical OR operation to a bitstring of the destination network node and bitstrings of other destination nodes whose BFR-NBRs are the same as a backup BFR-NBR (BBFR-NBR) for the destination network node.

8. The method of claim 1, wherein the EP-BIFT includes a backup bit forwarding router neighbor (BBFR-NBR) field, and wherein an entry in the BBFR-NBR field indicates a next hop on a shortest path to the backup egress node without using the primary egress node.

9. The method of claim 1, wherein a next hop identified in a backup bit forwarding router neighbor (BBFR-NBR) field for the primary egress node of the EP-BIFT is a basic loop-free alternate (LFA) bit forwarding router (BFR) for the backup egress node.

10. The method of claim 1, wherein a next hop identified in a backup bit forwarding router neighbor (BBFR-NBR) field for the primary egress node of the EP-BIFT is a remote loop-free alternate (LFA) bit forwarding router (BFR) for the backup egress node.

11. The method of claim 1, wherein a next hop identified in a backup bit forwarding router neighbor (BBFR-NBR) field for the primary egress node of the EP-BIFT is a topology independent loop-free alternate (LFA) bit forwarding router (BFR) for the backup egress node.

12. The method of claim 1, wherein a next hop identified in a backup bit forwarding router neighbor (BBFR-NBR) field for the primary egress node of the EP-BIFT is the backup egress node through a tunnel to the backup egress node without going through the primary egress node.

13. A network node neighboring a primary egress node in a Bit Index Explicit Replication (BIER) domain, comprising:
a memory storing instructions; and
one or more processors coupled to the memory, wherein the one or more processors are configured to execute the instructions to cause the network node to:
receive a type length value (TLV) structure that identifies a backup egress node for the primary egress node and includes an entry that indicates whether the primary egress node and the backup egress node transmit a packet to a same customer edge (CE) receiver or to different CE receivers;
generate an egress protection bit index forwarding table (EP-BIFT) including the backup egress node and the entry that indicates whether the primary egress node and the backup egress node transmit the packet to the same CE receiver or to different CE receivers; and
forward the packet in accordance with the EP-BIFT when the primary egress node has failed.

14. The network node of claim 13, wherein the TLV structure is received from the primary egress node.

15. The network node of claim 13, wherein the TLV structure is received from a neighbor network node.

16. The network node of claim 13, wherein the EP-BIFT includes a backup entry active (BEA) field for the primary egress node, and wherein an entry in the BEA field is set to indicate whether the primary egress node is working or has failed.

17. The network node of claim 13, wherein the entry that indicates whether the primary egress node and the backup egress node transmit the packet to the same CE or to the different CE receivers is disposed in a same CE receiver (SC) field in the EP-BIFT.

18. The network node of claim 13, wherein the backup egress node is identified in a backup egress bit forwarding edge router (BE-BFER) field in the EP-BIFT.

19. The network node of claim 13, wherein generating the EP-BIFT includes generating a backup forwarding bitmask (BF-BM) for a destination network node in the EP-BIFT by applying a logical OR operation to a bitstring of the destination network node and bitstrings of other destination nodes whose BFR-NBRs are the same as a backup BFR-NBR (BBFR-NBR) for the destination network node.

20. The network node of claim 13, wherein the EP-BIFT includes a backup bit forwarding router neighbor (BBFR-NBR) field for the primary egress node, and wherein an entry in the BBFR-NBR field indicates a next hop on a shortest path to the backup egress node without using the primary egress node.

21. The network node of claim 13, wherein a next hop identified in a backup bit forwarding router neighbor (BBFR-NBR) field for the primary egress node of the EP-BIFT is a basic loop-free alternate (LFA) bit forwarding router (BFR) for the backup egress node.

22. The network node of claim 13, wherein a next hop identified in a backup bit forwarding router neighbor (BBFR-NBR) field for the primary egress node of the EP-BIFT is a remote loop-free alternate (LFA) bit forwarding router (BFR) for the backup egress node.

23. The network node of claim 13, wherein a next hop identified in a backup bit forwarding router neighbor (BBFR-NBR) field for the primary egress node of the EP-BIFT is a topology independent loop-free alternate (LFA) bit forwarding router (BFR) for the backup egress node.

24. The network node of claim 13, wherein a next hop identified in a backup bit forwarding router neighbor (BBFR-NBR) field for the primary egress node of the EP-BIFT is the backup egress node through a tunnel to the backup egress node without going through the primary egress node.

25. A method implemented by a network node in a Bit Index Explicit Replication (BIER) domain, comprising:
generating a type length value (TLV) structure, wherein the TLV structure identifies a backup egress node for a primary egress node and includes an entry that indicates whether the primary egress node and the backup egress node transmit a packet to a same customer edge (CE) or to different customer edges (CEs); and
transmitting the TLV structure to a neighbor network node of the primary egress node.

26. The method of claim 25, wherein the TLV structure is an open shortest path first (OSPF) backup egress TLV.

27. The method of claim 25, wherein the TLV structure is an intermediate system-intermediate system (IS-IS) backup egress TLV.

* * * * *